US010457275B2

(12) United States Patent
Trent

(10) Patent No.: US 10,457,275 B2
(45) Date of Patent: Oct. 29, 2019

(54) HYBRID VEHICLE

(71) Applicant: FORD GLOBAL TECHNOLOGIES, LLC, Dearborn, MI (US)

(72) Inventor: James Trent, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 15/836,324

(22) Filed: Dec. 8, 2017

(65) Prior Publication Data
US 2019/0176806 A1    Jun. 13, 2019

(51) Int. Cl.
*B60W 10/02* (2006.01)
*B60W 20/30* (2016.01)
*B60W 10/06* (2006.01)
*B60W 10/08* (2006.01)
*B60W 20/20* (2016.01)
*B60W 10/10* (2012.01)
*F16H 3/72* (2006.01)
*B60W 20/40* (2016.01)
*B60L 15/20* (2006.01)

(52) U.S. Cl.
CPC ............ *B60W 20/30* (2013.01); *B60W 10/02* (2013.01); *B60W 10/06* (2013.01); *B60W 10/08* (2013.01); *B60W 10/10* (2013.01); *B60W 20/20* (2013.01); B60L 15/2054 (2013.01); *B60W 20/40* (2013.01); *B60W 2710/021* (2013.01); *B60W 2710/06* (2013.01); *B60W 2710/08* (2013.01); *F16H 3/725* (2013.01); *F16H 2200/2084* (2013.01); *F16H 2200/2087* (2013.01); *F16H 2200/2089* (2013.01); *Y10T 477/26* (2015.01)

(58) Field of Classification Search
CPC .................. Y10T 477/26; F16H 3/725; F16H 2200/2084; F16H 2200/2087; F16H 2200/2089; B60L 15/2054; B60W 20/40; B60W 20/30; B60W 10/10; B60W 10/08; B60W 10/06; B60W 10/02; B60W 2710/06; B60W 2710/021; B60W 2710/08
USPC ........................................................ 475/5
See application file for complete search history.

(56) References Cited

U.S. PATENT DOCUMENTS

| | | | |
|---|---|---|---|
| 7,172,525 B2 * | 2/2007 | Sowul .................... | B60K 6/365 475/5 |
| 8,182,391 B2 * | 5/2012 | Klemen ................. | B60K 6/365 477/5 |
| 8,454,466 B2 | 6/2013 | Samie et al. | |
| 8,562,480 B1 * | 10/2013 | Mellet .................... | F16H 3/725 475/317 |
| 8,622,870 B2 * | 1/2014 | Kawasaki ............. | B60K 6/365 477/3 |
| 8,639,423 B2 | 1/2014 | Schaaf et al. | |
| 2002/0086755 A1 * | 7/2002 | Hamai ................... | B60K 6/387 475/5 |

(Continued)

*Primary Examiner* — Roger L Pang
(74) *Attorney, Agent, or Firm* — David Kelley; Brooks Kushman P.C.

(57) ABSTRACT

A vehicle includes a planetary gear set, a gearbox, an electric machine, and an engine. The planetary gear set has a sun gear, a carrier, and a ring gear. The gearbox is configured to transmit power from the ring gear to vehicle wheels. The electric machine is fixedly coupled to the sun gear. The engine is selectively coupled to the ring gear via a first selectable one-way clutch and selectively coupled to the carrier via a second selectable one-way clutch.

17 Claims, 3 Drawing Sheets

(56) References Cited

U.S. PATENT DOCUMENTS

| | | | | |
|---|---|---|---|---|
| 2008/0176697 A1* | 7/2008 | Raghavan | ............... | F16H 3/728 |
| | | | | 475/5 |
| 2011/0092328 A1* | 4/2011 | Tiwari | .................. | B60K 6/365 |
| | | | | 475/5 |
| 2011/0111910 A1* | 5/2011 | Ideshio | .................... | B60K 6/36 |
| | | | | 475/5 |
| 2011/0220428 A1 | 9/2011 | Ando | | |
| 2013/0035188 A1* | 2/2013 | Yagasaki | ............... | B60K 6/365 |
| | | | | 475/5 |
| 2013/0109530 A1* | 5/2013 | Kaltenbach | ............ | B60K 6/387 |
| | | | | 477/5 |
| 2015/0343890 A1* | 12/2015 | Ortmann | ................ | B60K 6/383 |
| | | | | 477/5 |
| 2016/0096522 A1 | 4/2016 | Ortmann et al. | | |
| 2017/0136867 A1 | 5/2017 | Holmes et al. | | |
| 2018/0319266 A1* | 11/2018 | Kaltenbach | ........... | F16H 37/046 |

\* cited by examiner

HYBRID VEHICLE

TECHNICAL FIELD

The present disclosure relates to hybrid vehicles and hybrid vehicle powertrain configurations.

BACKGROUND

Hybrid vehicles may utilize multiple power sources to generate power within a powertrain of the hybrid vehicle.

SUMMARY

A vehicle includes a planetary gear set, a gearbox, an electric machine, and an engine. The planetary gear set has a sun gear, a carrier, and a ring gear. The gearbox is configured to transmit power from the ring gear to vehicle wheels. The electric machine is fixedly coupled to the sun gear. The engine is selectively coupled to the ring gear via a first selectable one-way clutch and selectively coupled to the carrier via a second selectable one-way clutch.

A vehicle includes a planetary gear set, an electric machine, an engine, and at least one drive wheel. The planetary gear set has a sun gear, a carrier, and a ring gear. The electric machine has a rotor fixedly coupled to the sun gear. The engine is selectively coupled to the ring gear via a first selectable one-way clutch and selectively coupled to carrier via a second selectable one-way clutch. The at least one drive wheel is coupled to the ring gear.

A vehicle includes a planetary gear set, a multiple step-ratio transmission, an electric machine, and an engine. The planetary gear set has a sun gear, a carrier, and a ring gear. An input of the multiple step-ratio transmission is fixedly coupled to the ring gear. The electric machine is fixedly coupled to the sun gear. The engine is selectively coupled to the ring gear via a first clutch and selectively coupled to the carrier via a second clutch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
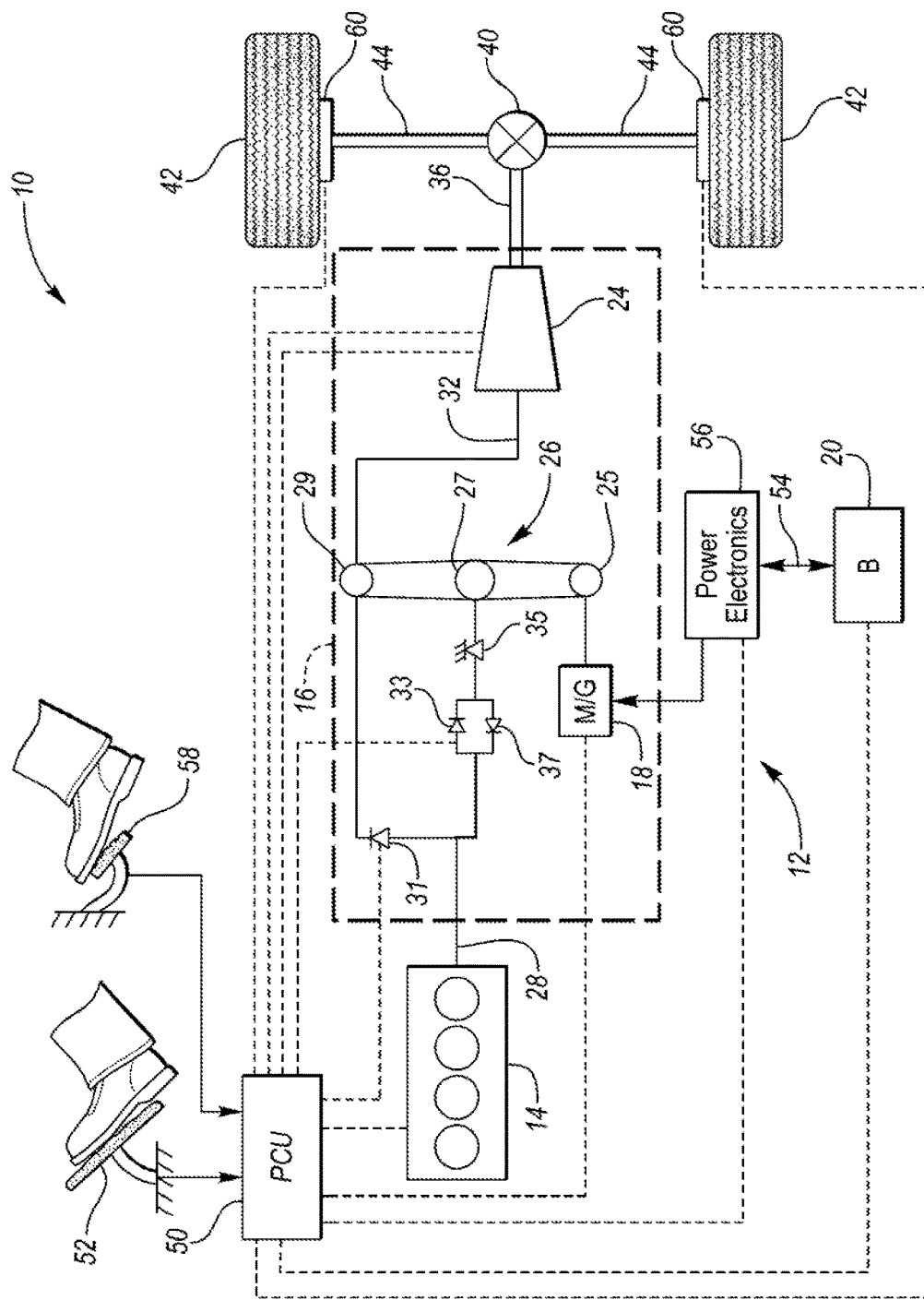
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, the transmission 16 includes an electric machine such as an electric motor/generator (M/G) 18, a gearbox 24, and a planetary gear set 26.

A gearing arrangement, such as the gearbox 24 and/or planetary gear set 26, is a collection of rotating elements and/or clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one-way clutches. A clutch that holds an element against rotation by selectively connecting the element to a fixed component, such as a transmission housing, may be called a brake.

The planetary gear set 26 may include a sun gear 25, a carrier 27, and a ring gear 29. The carrier 27 may be fixedly coupled to both the sun gear 25 and ring gear 29 by one or more planet gears (not shown). The engine 14 (or more specifically a crankshaft 28 of the engine 14) may be selectively coupled to the ring gear 29 by a first selectable one-way clutch 31. The engine 14 and the ring gear 29 may be disconnected when the first selectable one-way clutch 31 is disengaged. The engine 14 and the ring gear 29 may be connected when the first selectable one-way clutch 31 is engaged. When the first selectable one-way clutch 31 is engaged, the engine 14 may drive and deliver power to the planetary gear set 26 (or more specifically the ring gear 29) in the rotational direction of operation of the engine 14 (whether it be clockwise or counter clockwise).

The engine 14 (or more specifically the crankshaft 28) may also be selectively coupled to the carrier 27 by a second selectable one-way clutch 33. The engine 14 and the carrier 27 may be disconnected when the second selectable one-way clutch 33 is disengaged. The engine 14 and the carrier 27 may be connected when the second selectable one-way clutch 33 is engaged. When the second selectable one-way clutch 33 is engaged, the engine 14 may drive and deliver power to the planetary gear set 26 (or more specifically the carrier 27) in the rotational direction of operation of the engine 14.

Figure 3:
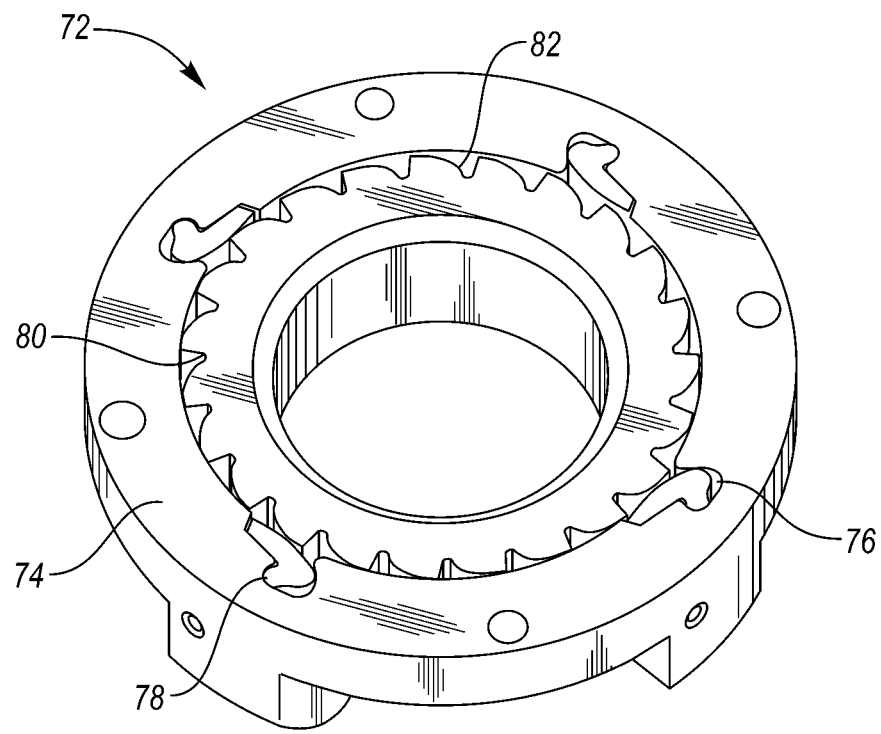
FIG. 3 is a schematic view of an exemplary electromagnetic one-way clutch.
Figure 4:
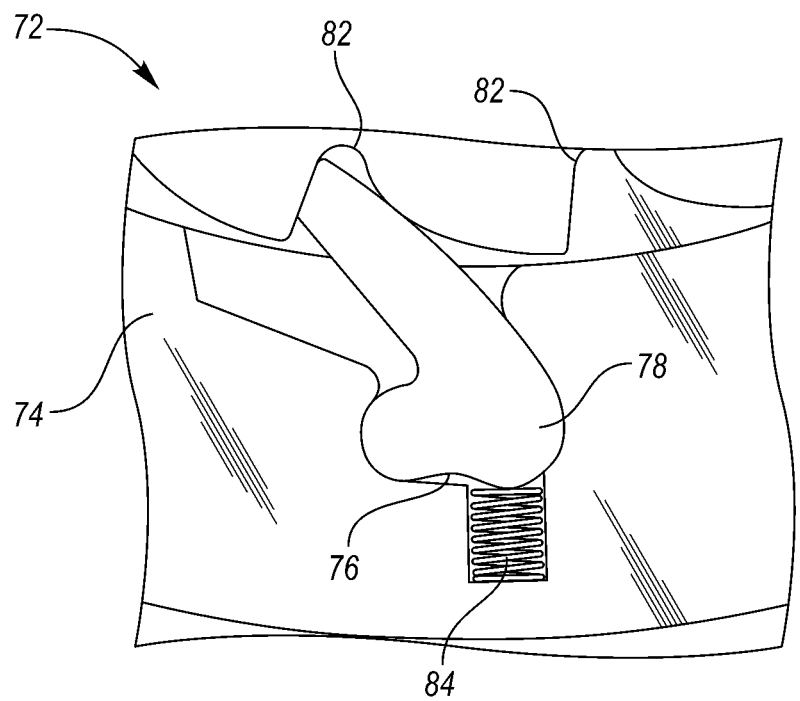
FIG. 4 is a detail view of the exemplary electromagnetic one-way clutch.

A third one-way clutch 35, which may be a non-selectable one-way clutch, prevents rotation of the carrier in a direction that is the opposite to or reverse of the rotational direction of operation of the engine 14. A fourth one-way clutch 37, which may be a selectable one-way clutch, may selectively couple the engine 14 (or more specifically the crankshaft 28) and the carrier 27 in a direction that is opposite to the rotational direction of operation of the engine 14. The second selectable one-way clutch 33 and fourth selectable one-way clutch 37 may be a single clutch that includes two sets of rockers that engage in opposite directions. An example of a selectable one-way clutch having rockers that engage is a single direction is illustrated in FIGS. 3 and 4 below. A modified clutch that include a first set of rockers that engage notches in a clockwise direction (shown in the clutch in FIGS. 3 and 4) and a set of rockers that engage notches in a counter-clockwise direction (not shown in the clutch in FIGS. 3 and 4) could be utilized as the single clutch that incorporates the second selectable one-way clutch 33 and fourth selectable one-way clutch 37. It should be understood that engagement of the fourth one-way clutch 37 does not result in the carrier 27 or engine 14 rotating the direction that is opposite to the rotational direction of operation of the engine 14 but simply allows torque or power to flow from the carrier 27 to the engine 14, which may occur under certain circumstances. For example, torque or power may flow from the carrier 27 to the engine 14 when the HEV 10 is slowing down during a tip-out or when brakes are being applied to slow the HEV 10.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the planetary gear set 26 (or more specifically either the ring gear 29 or carrier 27 depending of the state of the one-way clutches 31, 33). The M/G 18 may be implemented by any one of a plurality of types of electric machines. For example, M/G 18 may be a permanent magnet synchronous motor. Power electronics condition direct current (DC) power provided by a traction battery 20 to the requirements of the M/G 18, as will be described below. For example, power electronics may provide three phase alternating current (AC) to the M/G 18. The M/G 18 is fixedly coupled to the sun gear 25 of the planetary gear set 26. More specifically, a rotor of the M/G 18 is fixedly coupled to the sun gear 25.

The M/G 18 may operate as a motor and generate power and corresponding torque that is supplied to the planetary gear set 26 (or more specifically the sun gear 25). Alternatively, power and corresponding torque may be delivered to the M/G 18 from the planetary gear set 26 so that the M/G 18 may operate as a generator recharge the battery 20. More specifically, power may be transferred from the engine 14 or through regenerative braking to the M/G 18 via the planetary gear set 26 so that the M/G 18 may operate as a generator recharge the battery 20. The M/G 18 (or the rotor of the M/G 18) and the sun gear 25 rotate in the direction that is the opposite to or reverse of the rotational direction of operation of the engine 14 when the M/G 18 is delivering power to the planetary gear set 26. The M/G 18 and the sun gear 25 rotate in the direction of operation of the engine 14 when power is being delivered to the M/G 18 from the planetary gear set 26.

The M/G 18 may also regulate the speed of the ring gear 29 in a similar manner as a continuously variable transmission while the engine 14 is delivering power to the planetary gear set 26 through either the carrier 27 or the ring gear 29. Utilizing the M/G 18 to regulate the speed of the ring gear while the engine 14 is delivering power to the planetary gear set 26 may be referred to as an electronically controlled continuously variable transmission (ECVT) mode.

The gearbox 24 may only include fixedly coupled rotating elements (e.g., shafts or gears) that are configured to provide a single gear ratio between an input shaft 32 and an output shaft 36 of the gearbox 24. Alternatively, the gearbox 24 may be a multiple step-ratio automatic transmission that includes fixedly coupled rotating elements (e.g., shafts or gears) and selectively coupled rotating elements (e.g., clutches) that are configured provide multiple gear ratios between the input shaft 32 and the output shaft 36 of the gearbox 24. More specifically, the gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24 via the planetary gear set 26 (or more specifically the ring gear 29 which is fixedly coupled to the input shaft 32 of the gearbox 24). The gearbox 24 then provides powertrain output power and torque to the output shaft 36 and eventually to drive wheels 42 of the HEV 10.

It should be understood that the hydraulically controlled gearbox 24 is but one example of a gearbox or transmission arrangement; any single or multiple ratio gearbox that accepts input torque(s) from an engine and/or a motor and then provides torque to an output shaft is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 in turn is connected to the drive wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The gearbox 24 (or more specifically the output shaft 36) may be fixedly coupled to the drive wheels 42 via the differential 40 and the axles 44. Alternatively, the gearbox 24 may be selectively coupled to the drive wheels 42 via the differential 40 and the axles 44 in the event there is a clutch disposed somewhere between the gearbox 24 and drive wheels 42. For example, the differential may be a slipping differential that includes one or more clutches. The ring gear 29 may be fixedly coupled to the drive wheels 42 via the input shaft 32, gearbox 24, output shaft 36, differential 40, and the axles 44 in the event that he gearbox only includes one gear ratio and there are no other clutches disposed between the ring gear 29 and the drive wheels 42. Alternatively, the ring gear 29 may be selectively coupled to the drive wheels 42 via the input shaft 32, gearbox 24, output shaft 36, differential 40, and the axles 44 in the event there is a clutch disposed somewhere between the ring gear 29 and drive wheels 42. For example, the gearbox 24 may be a multiple step-ratio automatic transmission that includes one or more clutches.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, M/G 18, battery 20, transmission gearbox 24, first selectable one-way clutch 31, second selectable one-way clutch 33, fourth one-way clutch 37, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24 if the gearbox 24 is a multiple step-ratio automatic transmission.

To drive the vehicle with the engine 14, either the first selectable one-way clutch 31 or second selectable one-way clutch 33 will be engaged to transfer power and torque from the engine 14 and to the gearbox 24 via the planetary gear set 26. The M/G 18 may assist the engine 14 by providing additional power to the gearbox 24 via the planetary gear set 26. This operation mode may be referred to as a "hybrid mode" or an "electric assist mode."

To drive the vehicle with the M/G 18 as the sole power source, the first selectable one-way clutch 31 and second selectable one-way clutch 33 will be disengaged to isolate the engine 14 from the planetary gear set 26 and the remainder of the powertrain 12 while the third one-way clutch 35 holds the carrier 27 stationary. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the sun gear 25 of the planetary gear set 26. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, planetary gear set 26, and is converted into electrical energy for storage in the battery 20.

In response to a condition or a command for the HEV 10 to operate in a specific mode of operation, the controller 50 may be programmed to operate the engine 14 and/or the M/G 18 based on the specific mode of operation. Also, in response to a condition or a command for the HEV 10 to operate in a specific mode of operation, the controller 50 may be programmed to engage or disengage the first selectable one-way clutch 31, the second selectable one-way clutch 33, and/or the fourth one-way clutch 37.

In an electric only drive mode where the M/G 18 is commanded to operate to deliver power and/or torque to the planetary gear set 26 alone, the controller 50 is programmed to disengage the first selectable one-way clutch 31, disengage the second selectable one-way clutch 33, and hold the carrier 27 against rotation (which may be accomplished with the third one-way clutch 35). More specifically in the electric only drive mode, the power and/or torque of the M/G 18 is transferred to the ring gear 29 of the planetary gear set 26 via the M/G 18 turning the sun gear 25. The ring gear 29 then transfers the power and/or torque of the M/G 18 to the remainder of the powertrain 12.

In a mode where the engine 14 is commanded to power the M/G 18 (i.e., deliver power to the M/G 18 so that the M/G 18 operates as a generator) to charge the battery 20 while the HEV 10 is stopped, the controller 50 is programmed to disengage the first selectable one-way clutch 31, engage the second selectable one-way clutch 33, and brake the ring gear 29 to prevent rotation of the ring gear 29. More specifically, when transition to the charging mode while the HEV 10 stopped, the sequence of operation may include turning on the engine 14, increasing the speed of the M/G 18 to a speed that is greater than the speed of the crankshaft 28, deploying the second selectable one-way clutch 33, and slowing the speed of the M/G 18 so the second selectable one-way clutch 33 engages. A selectable one-way clutch may be deployed without engaging under circumstances, such as when the clutch is in an overrunning state. For example, a one-way clutch may include rockers disposed on a first side of the clutch that engage notches on an opposing side of the clutch when the rockers are deployed (see FIGS. 3 and 4 below). In the event the that the opposing side of the clutch is rotating faster than the first side of the clutch, the rockers may deploy but will not engage. Once the second selectable one-way clutch 33 engages the speed of the crankshaft 28 and a rotor of the M/G 18 will be synchronized and the engine 14 may then operate to turn the rotor of the M/G 18 in order to generate electricity to charge the battery 20. The ring gear 29 and the remainder of the powertrain 12 from the drive wheels 42 to the ring gear 29 may be held stationary during the charging mode by a braking mechanism such as the friction brakes 60 located at the drive wheels 42. An alternative mode where the engine 14 is commanded to power the M/G 18, may include programming the controller 50 to engage the first selectable one-way clutch 31 and disengage the second selectable one-way clutch 33.

In a first hybrid mode where the engine 14 and the M/G 18 are both commanded to deliver power to the planetary gear set 26, the controller 50 is programmed to engage the first selectable one-way clutch 31, disengage the second selectable one-way clutch 33, and brake the carrier 27 to hold the carrier 27 against rotation (which may be accomplished with the third one-way clutch 35). The first hybrid mode may also be an ECVT mode where the M/G 18 regulates the speed of the ring gear while the engine 14 is also delivering power to the planetary gear set 26. More specifically, when transitioning to the first hybrid mode, the sequence of operation may include turning on the engine 14 and deploying the first selectable one-way clutch 31. Once the speed of the engine 14 reaches the speed of the ring gear 29, the first selectable one-way clutch 31 will engage and the engine 14 will then provide power and torque directly to the ring gear 29. The power and torque of the M/G 18 is transferred to the ring gear 29 of the planetary gear set 26 via the M/G 18 turning the sun gear 25 in the first hybrid mode. The ring gear 29 then transfers the power and torque of the engine 14 and the M/G 18 to the remainder of the powertrain 12. The first hybrid drive mode may be utilized during an engine start while the vehicle is in motion, during wide open throttle (WOT) condition where maximum torque is being commanded to the ring gear 29, or any another suitable condition.

In a second hybrid where both the engine 14 and the M/G 18 are both commanded to deliver power to the planetary gear set 26, the controller 50 is programmed to disengage the first selectable one-way clutch 31 and engage the second selectable one-way clutch 33. The second hybrid mode may also be an ECVT mode where the M/G 18 regulates the speed of the ring gear while the engine 14 is also delivering power to the planetary gear set 26. More specifically, when transitioning to the second hybrid mode, the sequence of operation may include turning on the engine 14 and deploying the second selectable one-way clutch 33. Once the speed of the engine 14 reaches the speed of the carrier 27, the second selectable one-way clutch 33 will engage and the engine 14 will then provide power and torque directly to the carrier 27. Alternatively, the HEV 10 may transition to the second hybrid mode from a charging mode (where the engine 14 is already operating and the second selectable one-way clutch 33 is already engaged) by transitioning the M/G 18 from operating as a generator (where the rotor of the M/G 18 and sun gear 25 rotate in the same direction as the direction of operation of the engine 14) to operating as a motor (where the rotor of the M/G 18 and sun gear 25 rotate in a direction that is the opposite of the rotational direction of operation of the engine 14).

In an engine only drive mode (or direct drive mode) where the engine 14 is commanded to operate to deliver power and torque to the planetary gear set 26 alone, the controller 50 is programmed to engage the first selectable one-way clutch 31 and disengage the second selectable one-way clutch 33. More specifically, when transitioning to the engine only drive mode, the sequence of operation may include turning on the engine 14 and deploying the first selectable one-way clutch 31. Once the speed of the engine 14 reaches the speed of the ring gear 29, the first selectable one-way clutch 31 will engage and the engine 14 will then provide power and torque directly to the ring gear 29. The M/G 18 may be commanded to shut down (i.e., does not operate either a generator or a motor) during the engine only drive mode.

The controller 50 may be programmed to implement a series of steps when transitioning the HEV 10 from the engine only drive mode to the second hybrid mode. First, the M/G 18 is commanded to rotate the sun gear 25 in the same direction as the rotation of the ring gear 29 (which is also the direction of operation of the engine 14) until the rotation speed of the carrier 27 (which is also rotating in the direction of operation of the engine 14) becomes greater than the rotational speed of the engine 14 (i.e., the rotational speed of the crankshaft 28). Once the speed of the carrier 27 becomes greater than the rotational speed of the engine 14, the second selectable one-way clutch 33 is deployed. Once the second selectable one-way clutch 33 is deployed, the speed of the M/G 18 is reduced to reduce the speed of the carrier 27 so that the second selectable one-way clutch 33 engages and to transfer engine torque from the ring gear 29 to the carrier 27. Once the engine torque is transferred from ring gear 29 to the carrier 27, the first selectable one-way clutch 31 may be retracted. The first selectable one-way clutch 31 may enter an overrunning state before it is retracted.

The controller 50 may be programmed to implement another series of steps when transitioning the HEV 10 from the second hybrid mode to the engine only drive mode. First, the M/G 18 is commanded to rotate the sun gear 25 in the opposite direction of the rotation of the ring gear 29 (which is the opposite of the rotational direction of operation of the engine 14) until the rotation speed of the carrier 27 (which is in the direction of operation of the engine 14) becomes less than the rotational speed of the engine 14 (i.e., the rotational speed of the crankshaft 28) and until the rotational speed of the ring gear 29 (which is also in the direction of operation of the engine 14) becomes greater than the rotational speed of the engine 14. Once the rotational speed of the ring gear 29 becomes greater than the rotational speed of the engine 14, the first selectable one-way clutch 31 is deployed. Once the first selectable one-way clutch 31 is deployed, the speed of the M/G 18 is reduced to reduce the speed of the ring gear 29 so that the first selectable one-way clutch 31 engages and so that engine torque is transferred from the carrier 27 to the ring gear 29. Once the engine torque is transferred from the carrier 27 to the ring gear 29, the second selectable one-way clutch 33 may be retracted. The second selectable one-way clutch 33 may enter an overrunning state before it is retracted.

It should be understood that the schematic illustrated in FIG. 1 is merely exemplary and is not intended to be limiting. Other configurations are contemplated that utilize selective engagement of both an engine and a motor to transmit through the transmission. For example, an additional motor may be provided to start the engine 14. Other configurations are contemplated without deviating from the scope of the present disclosure.

Figure 2:
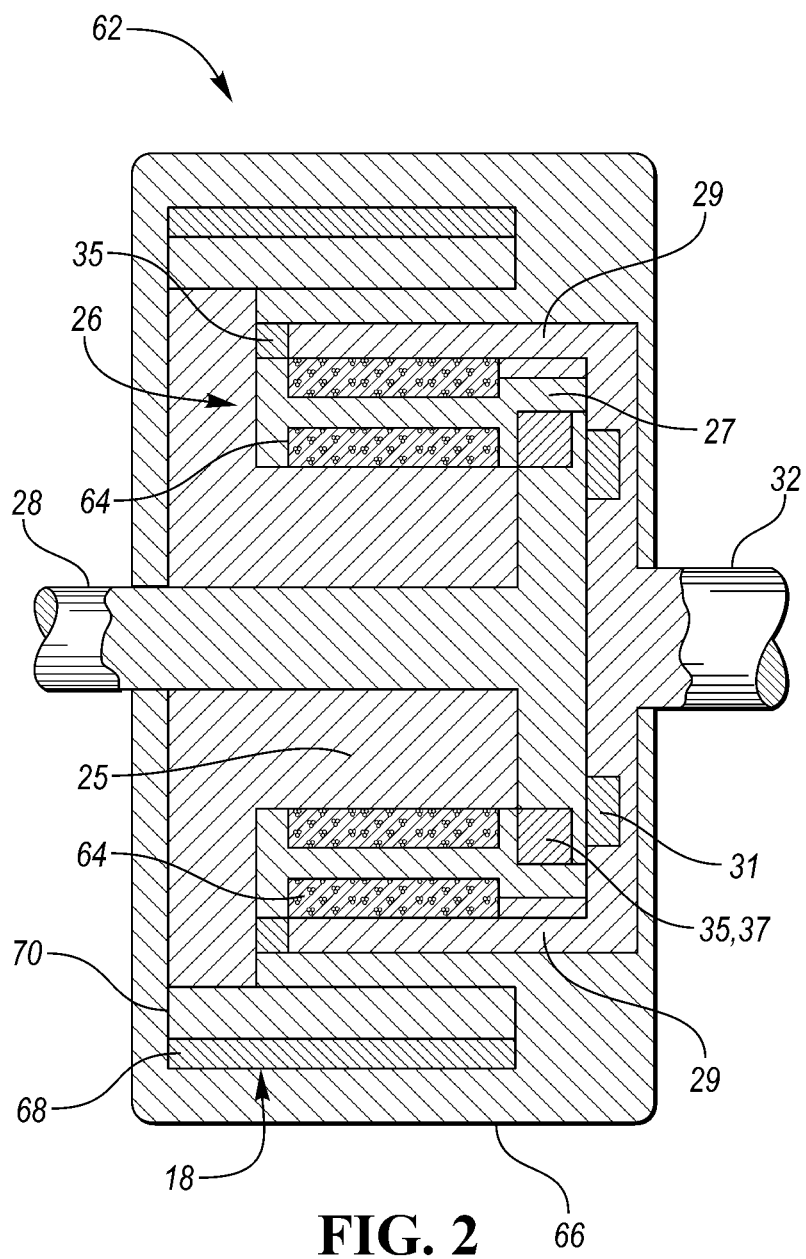
FIG. 2 is a cross-sectional view of a module that includes an electric machine and a planetary gear set.

Referring to FIG. 2, a cross-sectional view of a module 62 that includes the M/G 18 and the planetary gear set 26, including the sun gear 25, carrier 27, and ring gear 29 is illustrated. Planet gears 64 are rotatably secured to the carrier 27. The planet gears 64 fixedly couple the carrier 27 to the sun gear 25 and the ring gear 29. The module 62 may be a modular component that is disposed between engine 14 and the gearbox 24 that includes an external housing 66. Alternatively, the housing 66 may be a portion of the housing the contains the various components (i.e., gears, shaft, clutches, etc.) within the gearbox 24. For example, the housing 66 may be the portion the gearbox housing that typically contains a torque converter (i.e., the bell housing). The M/G 18 includes a stator 68 that is affixed to the housing 66 and rotor 70 that is affixed to the sun gear 25. Components of the first selectable one-way clutch 31 are integrated into the crankshaft 28 (or some intermediary component that is affixed to the crankshaft 28) and the ring gear 29 (or some intermediary component that is affixed to the ring gear 29). Components of the second selectable one-way clutch 33 and fourth one-way clutch 37 are integrated into the crankshaft 28 (or some intermediary component that is affixed to the crankshaft 28) and the carrier 27 (or some intermediary component that is affixed to the carrier 27). Components of the third one-way clutch 35 are integrated in the carrier 27 and the housing 66 so that the carrier 27 is able rotate in the rotational direction of operation of the engine 14 and is held against rotation in the direction that is the opposite to the rotational direction of operation of the engine 14.

Referring now to FIGS. 3 and 4, a rocker one-way clutch 72 (which may be an electromagnetic clutch) as may be used in conjunction with the present disclosure is illustrated schematically. More specifically, a clutch similar to the rocker one-way clutch 72 may be used as the first selectable one-way clutch 31, the second selectable one-way clutch 33, and/or the fourth one-way clutch 37. The one-way clutch 72 includes a rocker plate 74 having pockets 76, each pocket 76 containing a corresponding rocker 78 which is pivotally hinged within the respective pockets 76. The clutch 72 also includes a cam plate 80, which has a plurality of notches 82 that define teeth. When the rockers 78 are pivoted relative to the pockets 76, the teeth may catch inwardly extending portions of the rockers 78. The rockers 78 are biased by a spring 84 to remain within the pockets without protruding. In this configuration, there is no engagement between the rockers 78 and the notches 82, and thus no torque is transferred between the rocker plate 74 and cam plate 80. FIG. 3 illustrates the clutch 72 in this disengaged position.

The cam plate 80 contains a coil [not illustrated] that may be selectively electrified to produce a magnetic force and engage the clutch 72. In response to the magnetic force, the rockers 78 pivot outward (i.e., deploy) from the pockets 76, against the bias force of the spring 84, such that a portion of the rockers 78 protrudes beyond a radially inward face of the rocker plate 74. The protruding portion of the rockers 78 may engage with the notches 82 and transfer torque between the rocker plate 74 and cam plate 80 in one direction of rotation. FIG. 4 illustrates the clutch 72 in this engaged position. Although the rocker plate 74 is illustrated as the outer race of the clutch 72 and the cam plate 80 is illustrated as the inner race of the clutch 72, it should be understood that the clutch 72 may include other configurations, such as a configuration where the cam plate 80 is the outer race and the rocker plate 74 is the inner race.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising;
    a planetary gear set having a sun gear, a carrier, and a ring gear;
    a gearbox configured to transmit power from the ring gear to vehicle wheels;
    an electric machine fixedly coupled to the sun gear;
    an engine selectively coupled to the ring gear via a first selectable one-way clutch and selectively coupled to the carrier via a second selectable one-way clutch; and
    a controller programmed to, in response to a command operate the electric machine to deliver power to the ring gear alone, disengage the first selectable one-way clutch, disengage the second selectable one-way clutch, and hold the carrier against rotation.

2. The vehicle of claim 1 further comprising a traction battery and wherein the controller is programmed to, in response to a command to operate the engine to power the electric machine to charge the traction battery while the vehicle is stopped, disengage the first selectable one-way clutch, engage the second selectable one-way clutch, and brake the ring gear.

3. The vehicle of claim 1, wherein the controller is programmed to, in response to a command to operate the engine and the electric machine in a first hybrid mode, engage the first selectable one-way clutch, disengage the second selectable one-way clutch, and hold the carrier against rotation.

4. The vehicle of claim 3, wherein the controller is further programmed to, in response a command to operate the engine and the electric machine in a second hybrid mode, disengage the first selectable one-way clutch and engage the second selectable one-way clutch.

5. The vehicle of claim 1, wherein the controller is programmed to, in response to a command to operate the engine alone to deliver power to the ring gear, engage the first selectable one-way clutch.

6. The vehicle of claim 1 further comprising a traction battery and wherein the controller is programmed to, in response to a command to operate the engine to deliver power to the ring gear and power the electric machine to charge the traction battery, engage one of the first and second selectable one-way clutches and disengage the other of the first and second selectable one-way clutches.

7. A vehicle comprising:
    a planetary gear set having a sun gear, a carrier, and a ring gear;
    an electric machine having a rotor fixedly coupled to the sun gear;
    an engine selectively coupled to the ring gear via a first selectable one-way clutch and selectively coupled to carrier via a second selectable one-way clutch;
    at least one drive wheel coupled to the ring gear; and
    a controller programmed to, in response to a command operate the electric machine to deliver power to the ring gear alone, disengage the first selectable one-way clutch, disengage the second selectable one-way clutch, and bold the carrier against rotation.

8. The vehicle of claim 7, wherein the at least one drive wheel is coupled to the ring gear via a multiple step-ratio transmission.

9. The vehicle of claim 7 further comprising a third one-way clutch configured to hold the carrier against rotation in a reverse direction.

10. The vehicle of claim 7 further comprising a traction battery and wherein the controller is programmed to, in response to a command to operate the engine to power the electric machine to charge the traction battery while the vehicle is stopped, disengage the first selectable one-way clutch, engage the second selectable one-way clutch, and brake the ring gear.

11. The vehicle of claim 7, wherein the controller is programmed to, in response a command to operate the engine and the electric machine in a first hybrid mode, disengage the first selectable one-way clutch and engage the second selectable one-way clutch.

12. The vehicle of claim 11, wherein the controller is further programmed to, in response to a command to operate the engine and the electric machine in a second hybrid mode, engage the first selectable one-way clutch, disengage the second selectable one-way clutch, and hold the carrier against rotation.

13. The vehicle of claim 7, wherein the controller is programmed to, in response to a command to operate the engine alone to deliver power to the ring gear, engage the first selectable one-way clutch.

14. The vehicle of claim 7 further comprising a traction battery and wherein the controller is programmed to, in response to a command to operate the engine to deliver power to the ring gear and power the electric machine to charge the traction battery, engage one of the first and second selectable one-way clutches and disengage the other of the first and second selectable one-way clutches.

15. A vehicle comprising:
    a planetary gear set having a sun gear, a carrier, and a ring gear;
    an input shaft of a multiple step-ratio transmission fixedly coupled to the ring gear, wherein the multiple step-ratio transmission is configured to provide multiple gear ratios between the input shaft and an output shaft of the multiple step-ratio transmission;
    an electric machine fixedly coupled to the sun gear;
    an engine selectively coupled to the ring gear via a first selectable one-way clutch and selectively coupled to the carrier via a second selectable one-way clutch;
    at least one drive wheel, wherein an output of the multiple step-ratio transmission is coupled to the at least one drive wheel; and
    a third one-way clutch configured to hold the carrier against rotation in a reverse direction.

16. The vehicle of claim 15 further comprising a controller programmed to, in response to a command operate the electric machine to deliver power to the ring gear alone, disengage the first clutch, disengage the second clutch, and hold the carrier against rotation.

17. The vehicle of claim 15 further comprising a traction battery and a controller, wherein the controller is programmed to, in response to a command to operate the engine to power the electric machine to charge the traction battery while the vehicle is stopped, disengage the first clutch, engage the second clutch, and brake the ring gear.

\* \* \* \* \*